Jan. 16, 1968   R. N. ANDERSON   3,363,800
CRATE STRUCTURE
Filed Oct. 1, 1965

INVENTOR.
RICHARD N. ANDERSON
BY Whittemore,
Hulbert & Belknap
ATTORNEYS

United States Patent Office 3,363,800
Patented Jan. 16, 1968

3,363,800
CRATE STRUCTURE
Richard N. Anderson, Rome, Ga., assignor to V. E.
Anderson Mfg. Co., Owensboro, Ky., a corporation
of Kentucky
Filed Oct. 1, 1965, Ser. No. 492,116
8 Claims. (Cl. 220—83)

ABSTRACT OF THE DISCLOSURE

Crate structure comprising a pair of generally rectangular end frames positioned in spaced apart aligned relation having hollow cross sections, cylindrical members extending between the top and the bottom of the end frames in spaced apart relation having the opposite ends thereof extending into but not through the top and bottom of the end frames, a plurality of cylindrical members extending between the end frames at the sides thereof in spaced apart relation, also extending at the opposite ends thereof into but not through the sides of the end frames, a floor member extending across the bottom of the crate structure and top closure means extending between the tubular members at the opposite sides and at the top of the crate structure whereby poultry may be economically and efficiently transported. The end frames being formed of a pair of oppositely opening hollow U-shaped members are held together by means of sleeves extending into the open ends of the U-shaped members.

---

In the past crate structure for transporting poultry or the like, have usually been rectangular and constructed of wood. Such crate structure is undesirable in that it has a relatively short life, low load capacity due to poor ventilation and little or no salvage value. In addition the crate structures of the past have been difficult to handle due to their weight and size, could not be efficiently sterilized and have resulted in bruising of poultry transported therein resulting in monetary loss.

It is therefore one of the objects of the present invention to provide improved crate structure.

Another object is to provide crate structure for poultry or the like designed and constructed to provide greater air ventilation and thus increased load capacity without bruising of the poultry which crate structure is easier handled and sterilized and has a longer life with increased salvage value.

Another object is to provide aluminum crate structure comprising a pair of generally rectangular end frames in parallel spaced apart aligned relation, aluminum tubing extending between the top and bottom of the end frames in spaced apart relation, aluminum tubing extending between the end frames at the sides thereof, a floor, a top and top closure.

Another object is to provide crate structure as set forth above wherein the floor comprises an aluminum plate extending between and rigidly secured to aluminum tubes at the sides and bottom thereof.

Another object is to provide crate structure as set forth above wherein the top includes an aluminum plate extending over half of the top of the crate between aluminum tubes at the sides and top thereof and the closure includes an aluminum plate secured to aluminum tubular members extending between the end frames adjacent the sides thereof for sliding movement between an open position under the top and a closed position over the top of the other half of the crate.

Another object is to provide crate structure as set forth above and further including means for aligning vertically stacked crates.

Another object is to provide crate structure which is simple in construction, economical to manufacture and efficient in use.

Other objects and features of the invention will become apparent as the description proceeds, especially when taken in conjunction with the accompanying drawings, illustrating a preferred embodiment of the invention, wherein.

Figure 1:
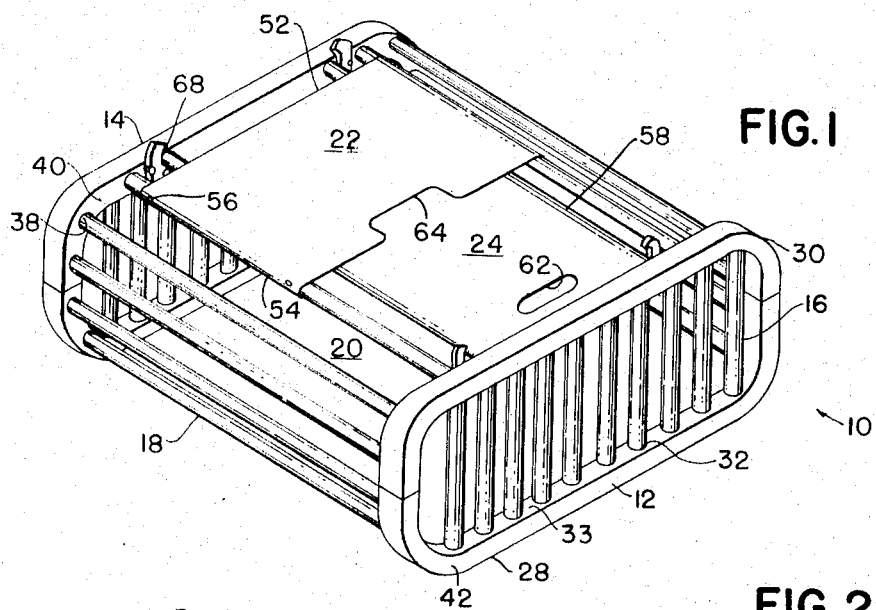
FIGURE 1 is a perspective view of crate structure constructed in accordance with the invention.
Figure 4:
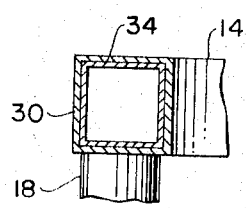
FIGURE 4 is an enlarged partial cross section of the crate structure illustrated in FIGURES 1–3 taken on the line 4—4 in FIGURE 3.

With particular reference to the figures of the drawing, one embodiment of the present invention will now be considered in detail.

The crate structure 10, illustrated best in FIGURE 1, includes a pair of end frames 12 and 14 positioned in parallel spaced apart aligned relation, a plurality of tubular members 16 extending between the top and bottom parts of the end frames 12 and 13 in spaced apart parallel relation, and a plurality of tubular members 18 extending between the end frames 12 and 14 at the sides thereof in spaced apart parallel relation. The crate structure 10 further includes a floor 20 on the bottom thereof, a top 22 on the top thereof and a closure 24. Alignment structure 26 is provided for aligning the crates 10 in vertical stacks.

Figure 3:
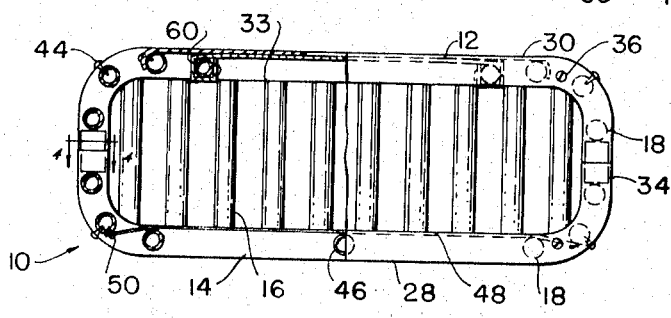
FIGURE 3 is a view of the crate structure illustrated in FIGURES 1 and 2 taken substantially on the line 3—3 in FIGURE 2.

More specifically the end frames 12 and 14 each include a bottom rectangular hollow aluminum extrusion 28 which is U-shaped and opens upwardly as illustrated in FIGURES 1 and 3. The end frames further include a top rectangular hollow aluminum extrusion 30 which is also U-shaped and opens downwardly. The extrusions 28 and 30 include openings 32 on the inner surface 33 thereof into which the cylindrical members 16 extend. As shown best in FIGURE 3, the cylindrical members 16 extend through the openings 32 and abut the opposite sides of the extrusions 28 and 30 in assembly therewith.

The top and bottom parts 28 and 30 of the end frames are secured together by means of a sleeve 34 which is shown as rectangular but could be round in cross section or have another cross section for the securing purpose desired and which is positioned within the open ends of the top and bottom parts 28 and 30 of the end frame between the parallel tubular members 18 at the sides of the end frames 12 and 14, as shown best in FIGURE 3. The end tubular members 16, as shown best in FIGURE 3, are secured to the top and bottom parts 28 and 30 of the end frames 12 and 14 by convenient means, such as screws 36. Thus, the top and bottom parts of the end frames 12 and 14, the tubular members 16 and the sleeves 34 are maintained in rigid assembly.

The tubular members 16 are hollow aluminum tubes and as illustrated extend vertically between the top and bottom parts 28 and 30 of the end frames 12 and 14 with the end members being rigidly secured to the end frame parts by means of the screws 36. The tubular members 18 extending between the end frames 12 and 14 at the sides thereof are also hollow aluminum tubes and extend through openings 38 on the inside surface 40 of the end frames 12 and 14 and abut against the outer wall 42 of the end frames 12 and 14. A tubular member 18 at each corner of the crate 10 is rigidly secured to the end frames 12 and 14 by convenient means, such as the screws 44.

As illustrated best in FIGURE 3, the tubular members 18 do not extend over the top of the crate 10. A single tubular member 46 is however positioned at the bottom of the crate structure 10 centrally thereof.

The bottom 20 of the crate structure 10 includes the aluminum plate 48 extending over an inner pair of the tubular members 18 at the bottom of the crate 10 and downwardly and outwardly beneath a second pair of the tubular members 18, as best shown in FIGURE 3. The plate 48 is then secured to at least one of the outer pair of tubular members 18 by convenient means, such as screw 50. The bottom plate 48 is supported centrally by the tubular member 46.

Figure 2:
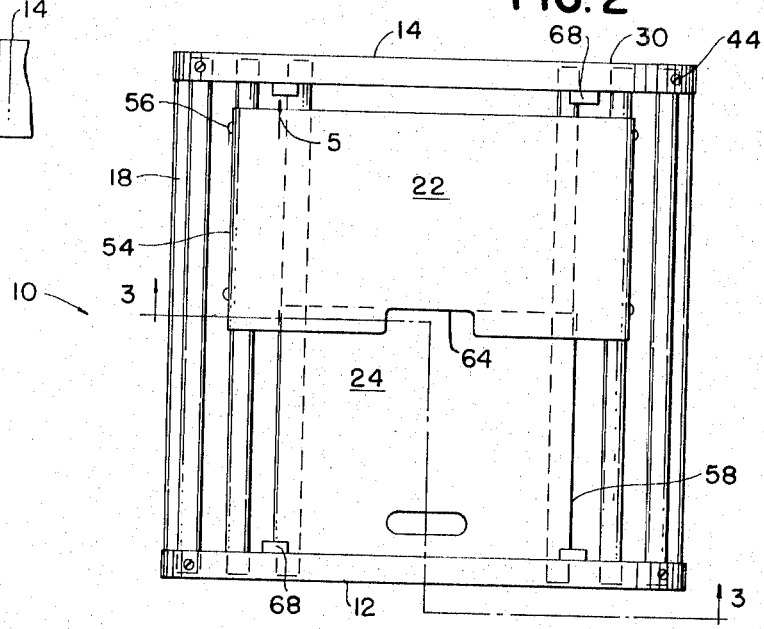
FIGURE 2 is a top view of crate structure illustrated in FIGURE 1.

The top 22 comprises an aluminum plate 52 which extends between a pair of the tubular members 18 at the top of the crate 10, as best shown in FIGURE 2. The ends 54 of the plate 52 are bent downwardly around the tubular members 18 and may be secured thereto by convenient means, such as metal screws 56. The plate 52 forms a top over substantially half of the crate structure 10 and has a notch or recess 64 in one edge thereof as shown in FIGURE 2.

The closure 24 is again an aluminum plate 58, the edges 60 of which are bent into a square tube about an inner pair of the tubular members 18 at the top and the sides of the end frames 12 and 14, as best shown in FIGURE 3. The plate 58 includes an oval or oblong opening 62 therein, as best shown in FIGURES 1 and 2, to permit easy opening of the closure 24 and securing thereof in a locked position, as by means of a wire or the like extending through the opening 62. While a wire may be used to secure the plate 58 in a closed position, it is not necessary since the plate 58 is provided with a slight crown in biased sliding engagement with the inside surface of the top plate 52. The closure 24 may thus be moved into an open position beneath the top 22 wherein the opening 62 is within the recess 64 or a closed position over substantially half of the top of the crate 10 as illustrated in FIGURE 1 and will remain in the position placed without accidental sliding or vibration allowing the door to open.

Figure 5:
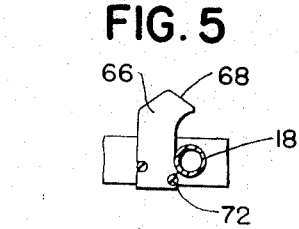
FIGURE 5 is an enlarged partial elevation view of the crate structure illustrated in FIGURES 1–4 taken substantially on the line 5—5 in FIGURE 2.

The aligning structure 26 includes placement guide members 66 secured to the top part 30 of the end frames 12 and 14 at each end thereof on the side 40 thereof operable in conjunction with the inner tubular members 18 and the adjacent tubular members 18 in the bottom of another vertically stacked crate to maintain stacked crates in vertical alignment. The placement guides 66 include a bevelled upper end 68 sloping in two directions and are further shaped as shown in FIGURE 5 to engage the inner top tubular members 18 and receive the securing screws 72. Movement of the placement guide in all directions is prevented due to the shape of the guide, the location thereof adjacent the upper, inner tubular members 18 and the screws 72 and the placement thereof.

In use, with the crate positioned as shown in FIGURE 1, the closure 24 may be slid under the top 22 and poultry placed in the crate 10 on the bottom 20, after which the closure 24 is slid into the closed position, as illustrated in FIGURE 1, and secured in such position if so desired. The crate 10 may then be stacked on a similar crate in vertical alignment on positioning of the inner two bottom tubular members 18 in engagement with placement guides 66 on a lower crate.

The crates 10 as thus disclosed are particularly easy to handle, have a long life, may be easily sterilized and have an increased salvage value due to the aluminum construction thereof. In addition the crates 10, as disclosed, due to their rounded corners have increased air ventilation when a plurality of vertical stacks are packed together as for transportion on a truck or the like, permitting greater load capacity. Also, due to the tubular construction of the crates bruising of the chickens is maintained at a minimum.

While one embodiment of the present invention has been disclosed in detail, it will be understood that other embodiments and modifications are contemplated. It is the intention to include all embodiments and modifications as are defined by the appended claims within the scope of the invention.

What I claim as my invention is:

1. Aluminum crate structure for transporting chickens or the like comprising a pair of aligned spaced apart end frames including a U-shaped bottom part and an inverted U-shaped top part, means for connecting the top and bottom parts together, a plurality of aluminum tubes extending between the top and bottom parts of the end frames in spaced apart parallel relation at least some of which are rigidly secured to the top and bottom parts of the respective end frame, a plurality of aluminum tubes extending between the end frames at the sides thereof at least some of which are rigidly secured to the end frames, a bottom plate extending between the tubular members at the opposite sides of the end frames at the bottom of the end frames, means for securing the bottom plate to the tubular members, a top plate secured to the tubular members at the opposite sides of the end frames adjacent the top of one of the end frames and a closure member slidably secured to other tubular members at the top of the end frames for sliding movement toward and away from said other end frame.

2. Structure as set forth in claim 1 wherein the end frames are constructed of rectangular hollow aluminum extrusions and the means for connecting the top and bottom parts of the end frames together comprises a sleeve positioned partly within the ends of each of the top and bottom parts of the end frames abutting the tubular members extending between the end frames.

3. Structure as set forth in claim 1 wherein the means connecting the bottom plate to the tubular members at the sides of the end frames includes a first tubular member at each side of the end frame over which the bottom plate extends and a second tubular member at each side of the end frame under which the bottom plate extends downwardly and outwardly of the crate structure and means for securing the bottom plate to at least one of the second tubular members.

4. Structure as set forth in claim 1 wherein the top plate extends over substantially half the distance between the end frames and the closure member is provided with rectangular edge parts fitting around aluminum tubular members extending between the end frames adjacent the sides thereof for sliding movement between an open position under the top plate and a closed position over substantially half of the top of the crate between the end frames.

5. Structure as set forth in claim 4 wherein the closure member is provided with a crown and is in engagement with the top plate under bias provided by the crown.

6. Structure as set forth in claim 1 and further including means for guiding crates into vertical alignment on stacking of the crates and for maintaining the crates in vertical stacked alignment.

7. Structure as set forth in claim 6 wherein the aligning means includes a placement guide secured adjacent the ends of the top part of each of the end frames of one crate having a bevelled upper end for guiding hollow tubular aluminum extrusions on the bottom of a crate stacked thereon into aligned stacked position.

8. Structure as set forth in claim 3 wherein each placement guide is irregularly formed to provide two recesses at an edge and one recess at the other edge between the two recesses longitudinally of the guide and is secured to an end frame by a tubular member in one recess and a screw in each of the other recesses.

References Cited

UNITED STATES PATENTS

| 141,389 | 7/1873 | Selling | 217—46 |
| 390,557 | 10/1888 | Booth et al. | 217—62 |
| 647,134 | 4/1900 | Ferris | 217—62 |
| 978,825 | 12/1910 | Peterman | 217—45 |
| 1,277,094 | 6/1918 | McClay | 220—84 |
| 2,619,250 | 11/1952 | Haberstump | 220—8 |

RAPHAEL H. SCHWARTZ, *Primary Examiner.*

THERON E. CONDON, *Assistant Examiner.*